April 6, 1965   D. E. CLARK   3,176,521
SENSING ASSEMBLY FOR LINEAR SERVO ACCELEROMETER
Filed July 3, 1961
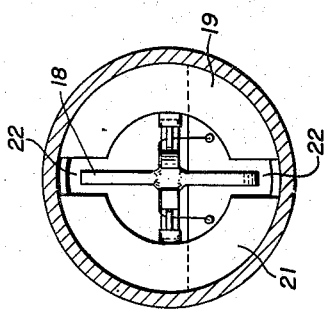
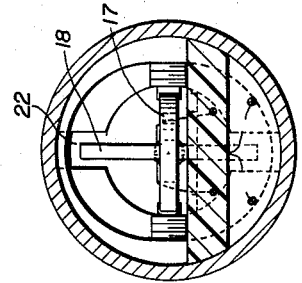
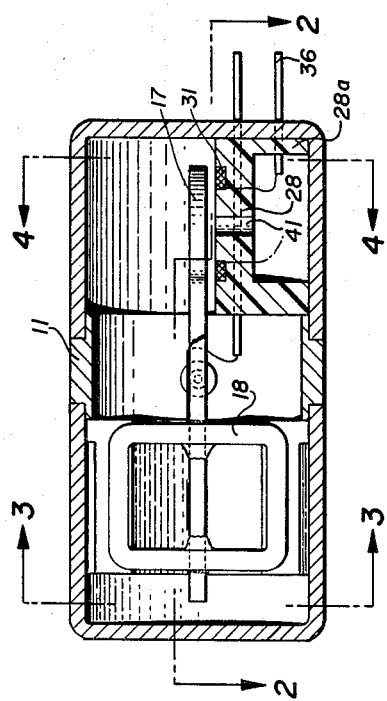
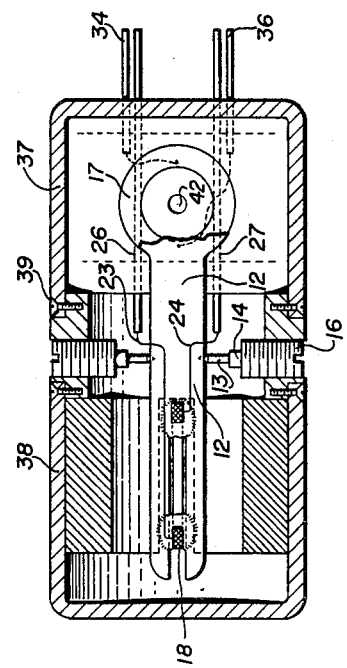
INVENTOR.
Donald E. Clark
BY
Attorneys 3,176,521
SENSING ASSEMBLY FOR LINEAR SERVO
ACCELEROMETER
Donald E. Clark, Concord, Calif., assignor, by mesne assignments, to Systron-Donner Corporation, Concord, Calif., a corporation of California
Filed July 3, 1961, Ser. No. 121,756
3 Claims. (Cl. 73—517)

This invention relates to a sensing assembly for servo accelerometers and more particularly to a sensing assembly for linear servo accelerometers.

In the past, the sensing mechanism for linear accelerometers has been rather bulky. There is a need for a sensing mechanism for linear servo accelerometers which is small in size and light in weight.

In general, it is an object of the present invention to provide a sensing assembly for linear servo accelerometers which is small in size and light in weight.

Another object of the invention is to provide a sensing assembly of the above character which is simply constructed and utilizes very few parts.

Another object of the invention is to provide a sensing assembly of the above character which is in a self-contained assembly and which is adapted to be detachably mounted in the servo accelerometer assembly.

Another object of the invention is to provide a sensing assembly of the above character which can be oil filled.

Additional objects and features of the invention will appear from the following description in which the preferred embodiment is set forth in detail in conjunction with the accompanying drawings.

Referring to the drawings:

FIGURE 1 is a cross-sectional view of a sensing assembly incorporating my invention.

FIGURE 2 is a cross-sectional view taken along the line 2—2 of FIGURE 1.

FIGURE 3 is a cross-sectional view taken along the line 3—3 of FIGURE 1.

FIGURE 4 is a cross-sectional view taken along the line 4—4 of FIGURE 1.

In general, my sensing assembly for a linear servo accelerometer consists of a cylindrical body. A member is pivotally mounted in the body and has a conducting planar element affixed to one end and a coil mounted on the other end. Pickoff means is disposed adjacent to the planar element and a magnet is disposed adjacent the coil. The coil and the planar element are arranged so that they lie in planes at right angles with respect to each other.

The sensing assembly, as shown in the drawings, consists of a cylindrical body 11 in the form of a ring or annulus. A member 12 is pivotally mounted in the body by means of pins 13 fixed to the member 12 and by jeweled bearings 14 accommodating the pins and carried by screws 16 threadedly mounted in the body 11. The member 12 is mounted in such a manner that it extends axially of the body 11 and rotates about an axis at right angles to the longitudinal axis of the body. A paddle or vane 17 in the form of a conducting plane is formed on one end of the member 12 and is disposed outside the body 11. The paddle or vane 17 can be formed of any suitable material such as aluminum. However, the paddle or vane must be able to modify a magnetic field as hereinafter described.

A coil 18 is mounted on the other end of the moving member 12. It can be formed in any desired manner such as the square loop shown in the drawing which is centered in both horizontal and vertical directions on the movable member 12. It preferably is mounted in such a manner that it lies in a plane at right angles to the plane in which the paddle 17 lies. The coil 18 moves in a magnetic field created by a pair of magnets 19 and 21. The magnets are secured to the body 11 by any suitable means such as by soldering. Air gaps 22 are formed between the magnets and are of sufficient width to permit movement of the coil 18 between the magnets. The coil 18 is connected by a pair of wires 23 and 24 to terminal posts 26 and 27 mounted in a block 28. The block 28 is formed of any suitable material such as plastic and is secured to the body 11 in a suitable manner such as by screws or cement. The block is supported by semi-cylindrical portions 28a which are an integral part of the block and which engage the cap hereinafter described.

A pancake type coil 31 is mounted on the upper face of block 28. It lies in a plane which is parallel to the plane of the paddle when the moving member 12 is in a mid-point or centered position. It will be noted that the coil 31 is positioned in such a manner that the paddle can either move from its mid-point, or centered position, towards the coil or away from the coil. Two wires 32 and 33 leading from the coil are connected to terminal posts 34 and 36 that are also mounted in the block 28. The coil 31 serves as a pickoff coil as hereinafter described. If desired, two windings instead of one winding may be utilized.

A pair of caps 37 and 38 of suitable material such as aluminum are mounted on opposite ends of the body by suitable means such as screws 39 and serve to enclose all the parts of the sensing assembly to provide a unitary assembly in which only the terminal posts 26 and 27, and 34 and 36 are exposed. If desired, the entire assembly can be filled with oil. A hole 41 in the block 28 and a hole 42 in the vane 17 have been provided to facilitate damping.

Operation and use of my sensing assembly may now be briefly described as follows. The sensing assembly is constructed in such a manner that it can be plugged into a socket mounted on the housing which encloses the accelerometer. As is well known to those skilled in the art, such an accelerometer may include an oscillator which is connected to the pickoff device, a detector which rectifies the output of the oscillator and an amplifier which amplifies the output of the detector. A certain portion of the output from the output amplifier is fed back to the moving coil 18 to apply a restoring force to the conducting planar element 17 to return the paddle 17 to its mid-point position or to maintain it in its mid-point position. An automatic balance is established between the input force provided by the coil and the force of acceleration on the paddle 17.

The sensing assembly is normally positioned in such a manner that it can sense linear acceleration. With a change in acceleration, the paddle will move toward or away from the coil 31 to modify the field about the pickoff coil. This causes a change in the current flow in the pickoff coil which causes a change in the output of the oscillator. This change in output is detected and amplified, and fed back to the coil 18 to reduce or increase the restoring force applied by the coil 18. As pointed out previously, the vane 17 is positioned in the magnetic field provided by the two magnets 19 and 21 so that a restoring force is applied to the moving member 12 in a direction which is directly opposite to that of the force of acceleration or deceleration.

As explained previously, if desired, the entire assembly can be filled with oil. The operation and use of the accelerometer will remain unchanged. The use of oil, however, serves to dampen out minor fluctuations in acceleration. The assembly is very small in size and light in weight. As can be seen by the drawing, it is simply constructed and is comprised of very few parts. Replacement of the assembly is facilitated by the use of the pin and socket arrangement for connecting the sensing assembly to the remainder of the accelerometer.

In one embodiment of my invention, the sensing assembly as shown in the drawings was one inch in length and one-half inch in diameter.

Although, the pivots for the member 12 have been shown as being between the paddle 17 and the torque coil 18, the pivots can be placed anywhere along the longitudinal axis of the member 12. For example, the pivots could be at one end and the torque coil 18 at the other end with the paddle 17 located between the pivots and the torque coil.

It is apparent from the foregoing that I have provided a new and improved sensing assembly for use with linear servo accelerometers. The construction is such that it is light weight and of very small size.

I claim:

1. In a sensing assembly for a linear servo accelerometer, a body, a substantially planar elongate strip having a width substantially greater than the thickness of the same and serving as a pendulous member, means engaging said strip between the ends of the same and pivotally mounting said strip in said body for movement about a pivot axis, said strip including a conducting planar vane formed as an integral part of said strip on one side of the pivot axis on one end of the strip and extending in the plane of the strip, said strip being formed with a slot extending longitudinally thereof on the other side of the pivot axis, a substantially planar restoring coil affixed in the slot in said strip and lying in a plane generally at right angles to the plane of the strip, a pair of magnets defining at least one air gap between the same, at least a portion of the restoring coil being disposed in at least one air gap, and a pickoff coil disposed adjacent the vane.

2. In a sensing assembly for a linear servo accelerometer, an annular body, a pendulous member, means pivotally mounting the pendulous member within said body so that the pendulous member extends in a direction substantially parallel to the longitudinal axis of the body, a substantially planar conducting element mounted on said member and serving as the mass to be accelerated, said member being formed with an elongate slot extending longitudinally thereof, a substantially planar restoring coil disposed in said slot and affixed to said member and lying in a plane at substantially right angles to the plane in which the planar element is lying, a pair of C-shaped magnets mounted on one side of said body and defining a pair of air gaps through which magnetic lines of flux pass, portions of the restoring coil being disposed in the air gaps so that magnetic lines of flux pass through the restoring coil, a block mounted on the other side of said body, a pickoff coil mounted on said body and lying in a plane substantially parallel to the plane of the planar element, a cylindrical cap removably mounted on each end of said annular body, one of said caps enclosing the magnets and the restoring coil and the other of said caps enclosing said block, the pickoff coil and the planar element, the outer circumferential surfaces of the caps and the annular body being substantially flush with each other, terminal posts mounted in said block and extending through the adjacent cap, means connecting one pair of the terminal posts to the restoring coil, and means connecting the other pair of terminal posts to the pickoff coil.

3. A sensing assembly as in claim 2 wherein said caps and annular body are oil filled and wherein said block is provided with a hole and wherein said substantially planar element is provided with a hole substantially in line with the hole in the block to facilitate damping.

References Cited by the Examiner

UNITED STATES PATENTS

| 2,310,213 | 2/43 | Buchanan | 73—514 |
| 2,593,339 | 4/52 | Ostermann | 73—517 X |
| 2,734,736 | 2/56 | Payne | 318—32 X |
| 2,939,072 | 5/60 | Bell | 73—517 X |
| 2,985,021 | 5/61 | Lewis | 73—517 |
| 2,995,935 | 8/61 | Eyestone | 73—517 |
| 3,042,343 | 7/62 | Cooke | 73—515 |
| 3,057,195 | 10/62 | Bently | 73—517 |
| 3,074,279 | 1/63 | Morris | 73—517 |

FOREIGN PATENTS 715,750   9/54   Great Britain.

RICHARD C. QUEISSER, *Primary Examiner.*

SAMUEL LEVINE, JOSEPH P. STRIZAK, JAMES J. GILL, *Examiners.*